Aug. 18, 1931.  A. E. G. NANDILLON ET AL  1,819,964
ELECTROMECHANICAL VIBRATOR
Filed May 22, 1928
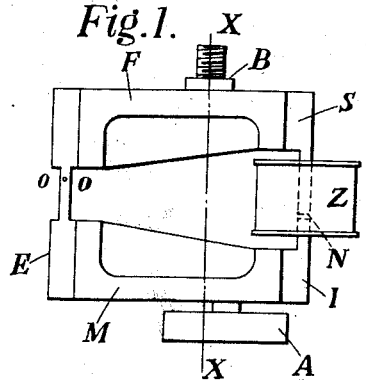
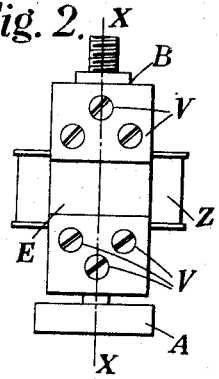
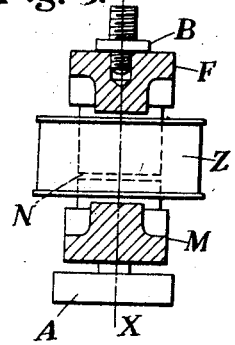
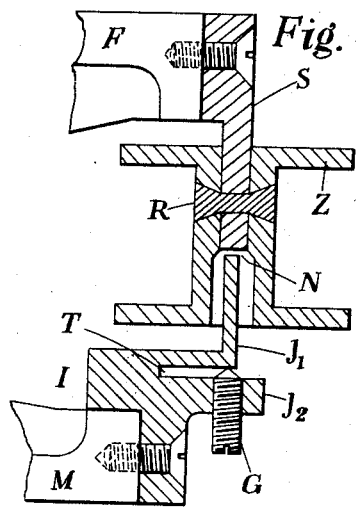
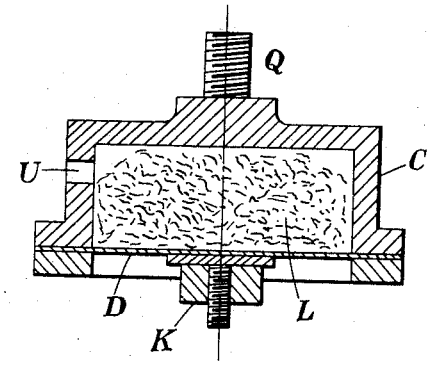
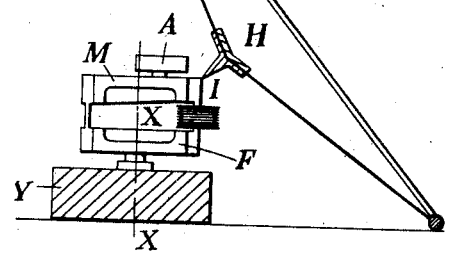
INVENTORS
A.E.G. NANDILLON
& A.E. COTTET
BY
Blair & Kilroyne
ATTORNEYS Patented Aug. 18, 1931

1,819,964

UNITED STATES PATENT OFFICE

ALBERT EMILE GUSTAVE NANDILLON, OF CHERBOURG, FRANCE, AND ANDRÉ EMILE COTTET, OF BRUSSELS, BELGIUM

ELECTROMECHANICAL VIBRATOR

Application filed May 22, 1928, Serial No. 279,818, and in France May 28, 1927.

The present invention relates to an electromechanical vibrator for the interconversion of electrical and mechanical energy of audible frequency and has for its object to provide a device of this kind of improved construction, which is particularly suitable for use in transmitters or receivers of sound in air or under water.

The device according to the invention comprises two masses rigidly assembled and connected together at one end by a thin elastic member. One of these masses is adapted to be rendered completely or almost completely immovable and the other is permitted to oscillate within limits, the freedom of oscillation being controlled by means of a mechanical damping arrangement hereinafter to be described.

This damper is rigidly fixed to the movable mass and is arranged ultimately to produce variations in the resonance frequencies of the system to suit particular requirements. When the device is employed, for example, in speech or music transmitters, this damper determines the quality of reproduction.

The invention will now be more fully described with reference to the specific embodiment thereof illustrated diagrammatically in the accompanying drawings, in which:—

Fig. 1 is a side elevation of the device, Fig. 2 is an end elevation and Fig. 3 is a sectional view on the line X—X of Fig. 1.

Fig. 4 is an enlarged section of a detail, illustrating the method of mounting the electric coil and the arrangement for adjusting the airgap.

Fig. 5 is an enlarged elevation, showing details of the damper, and

Fig. 6 represents the device arranged for acoustic-electrical translations in air.

Like parts have the same reference characters throughout the drawings and following description.

The fixed and movable rigid masses of the device are represented by F and M respectively. These masses consist of hard tempered and magnetic steel and are strengthened by ribs, shown more clearly in Fig. 3. The elastic member E comprises two reinforced end parts for connection to the rigid masses, for example, by screws V (Fig. 2), and a central part of reduced thickness. S and I are pole-pieces rigidly carried by the masses F and M respectively and Z is the coil fixed to the pole-piece S and embracing the airgap N. The mass M carries the mechanical damper A and the mass F is provided with means such as the stud B for attaching the device to a suitable support.

The pole pieces S and I are of mild steel of high permeability. The elastic member may be of the same material as S and I, but it is preferable for the steel employed to be of high elasticity.

The electromagnetic circuit formed by the rigid masses, elastic member and pole-pieces may be energized by means of a separa e continuous-current coil mounted on the bobbin Z, or, alternatively, parts of the circuit may comprise permanent magnets.

The electric coil mounting and means for regulating the airgap are shown in detail in Fig. 4 which also shows a slightly different construction of the pole piece I. This pole piece may be shaped as shown in Figure 1, but the preferred form is indicated in Figure 4.

The bobbin Z of cellulose acetate or other insulating rigid substance, is driven by force on the narrow part of the pole piece S. Holes are then pierced through the body of the bobbin and the pole piece. These holes are countersunk at each end and filled with a solution of cellulose acetate or other suitable substance which in solidifying forms a perfect rivet R.

For regulating the airgap, the pole piece I has its narrowed part $J_1$ partially severed from the remainder by the sawcut T. The other part $J_2$ of the pole piece is provided with a tight-fitting low pitch screw G which bears against the part J₁. Adjustment of the airgap is effected by manipulation of the screw G. Due to the symmetric construction, the faces of the airgap N are maintained parallel with one another for small deformations of the part J₁.

As shown in detail in Fig. 5, the damper A carried by the mass M in the vicinity of the loop of movement thereof consists of a rigid cup-shaped container C (the rigidity of which can be increased by ribbing without appreciably increasing the inertia) provided with an elastic diaphragm closure D which has attached thereto a frequency regulating mass K. The interior of the container is filled with metallic granules L through the opening U which is subsequently closed by a drop of wax, a stopper of dissolved cellulose acetate or other suitable means. A screw Q is provided on the substantially plane rigid end of the container for attaching the damper to the mass M.

When the mass M is set in oscillation, movement is transmitted to the granules L, which do not completely fill the container C, causing them to be shaken together. Thus a certain amount of energy is dissipated by friction produced by the granules rubbing one against the other and against the walls of the container. In this way, the oscillations of the mass M are damped.

The damper is preferably provided with an elastic diaphragm D which being itself set in oscillation by the movement of the mass M causes larger displacements of the granules L. By this means, the mechanical resistance of the damper is increased without increasing the inertia thereof. This is of advantage, since the greatest effective damping is produced by a damper having an optimum of inertia and mechanical resistance.

By means of the damper, resonances which the device possesses may be damped or accentuated, depending upon the use to which the arrangement is to be put and, further, it may be observed that slight inconsistencies due to manufacture can be compensated for without interfering with the main acoustic-electrical mechanism.

Clearly, the amount of damping produced is dependent upon a number of variable factors, such as, quantity and fineness of the granules L, the coefficient of friction of the material of the granules (lead is particularly suitable), etc. In addition, provision is made on the diaphragm D for attaching varying masses K for regulating its natural frequency.

The device described is especially suitable as the driving unit in loud speakers, microphones and other types of sound transmitters and receivers. A loud speaker embodying the invention is shown diagrammatically in Fig. 6, H being the cone diaphragm connected to the vibrating mass M. The device as a whole is mounted on the fixed support Y. Many variations in the construction of the vibrator and damper will be apparent to those acquainted with the art which it is not intended to discuss here. It is to be understood, therefore, that the invention is not limited in any way to the specific constructions described but is defined only by the appended claims.

We claim:

1. A reversible electromechanical vibrator adapted to operate on audible frequencies comprising in combination a pair of rigid masses, a thin elastic member connecting said masses, said masses and elastic member being composed in part at least of magnetic material and comprising an airgap, an electric coil mounted in the vicinity of said airgap and cooperating therewith, means for varying the width of said airgap and a damping device mounted on one of said masses, said damping device comprising a hollow body containing granular material.

2. A reversible electromechanical vibrator adapted to operate on audible frequencies comprising the combination of a pair of masses, a thin elastic member connecting said masses, said masses and elastic member being composed in part at least of iron and comprising an airgap, means for magnetizing said iron circuit, a stud mounted on one of said masses adapted for attachment to a diaphragm, an electric coil mounted in the vicinity of said airgap and cooperating therewith, and a damping device mounted on the other of said masses, said damping device comprising a hollow body containing granular material and having an elastic wall carrying a screw and adjusting weight.

3. In a sound receiving and reproducing device, a reversible electromechanical vibrator, comprising the combination of a pair of masses, provided with stiffening ribs, a thin elastic member connecting said masses, said masses and elastic member being composed of magnetized iron and comprising an airgap, an electric coil rigidly mounted on one of the masses and surrounding said airgap, an attachment stud mounted on one of said masses for attachment to a diaphragm and a damping device mounted on the other of said masses, said damping device comprising a hollow body containing granular material, and having an elastic wall carrying a screw and adjusting weight.

4. A device for the interconversion of electrical and mechanical energy, comprising the combination of a pair of masses provided with stiffening ribs, a thin elastic member connecting said masses, said masses and elastic member being composed of iron and comprising an airgap, an electric coil holder rigidly mounted on one of the masses and surrounding the airgap, electric coil windings on said coil holder, arranged to receive continuous current and alternating current, an attachment stud mounted on one of said masses and a damping device mounted on the other of said masses, said damping device comprising a hollow body containing granular material, and having an elastic wall carrying a screw and adjusting weight.

In testimony whereof we have hereunto affixed our signatures.

ALBERT EMILE GUSTAVE NANDILLON.
ANDRÉ EMILE COTTET.